United States Patent [19]

Min

[11] Patent Number: 5,581,305
[45] Date of Patent: Dec. 3, 1996

[54] AUTOMATIC PICTURE QUALITY COMPENSATING METHOD AND APPARATUS

[75] Inventor: Byoung W. Min, Kyungki-do, Rep. of Korea

[73] Assignee: Samsung Electronics Co., Ltd., Kyungki-Do, Rep. of Korea

[21] Appl. No.: 513,622

[22] Filed: Aug. 10, 1995

Related U.S. Application Data

[63] Continuation of Ser. No. 6,782, Jan. 21, 1993, abandoned.

[30] Foreign Application Priority Data

Jan. 21, 1992 [KR] Rep. of Korea .......................... 92-768

[51] Int. Cl.$^6$ ........................................... H04N 5/208
[52] U.S. Cl. ........................................ 348/571; 348/628
[58] Field of Search .................................. 348/571, 686, 348/687, 689, 625, 627, 628, 629, 177, 180, 189; 358/168, 169, 166, 167; H04N 5/20, 5/202, 5/208, 5/57, 9/64

[56] References Cited

U.S. PATENT DOCUMENTS

| | | | |
|---|---|---|---|
| 3,984,631 | 10/1976 | Avicola . | |
| 4,081,836 | 3/1978 | Skinner | 358/166 |
| 4,376,952 | 3/1983 | Troiano . | |
| 4,386,434 | 5/1983 | Gibson | 358/166 |
| 5,187,567 | 2/1993 | Srivastava . | |
| 5,191,421 | 3/1993 | Hwang | 358/168 |
| 5,327,228 | 7/1994 | Satyanarayana et al. | 348/628 |

FOREIGN PATENT DOCUMENTS

| | | | |
|---|---|---|---|
| 0034626 | 3/1977 | Japan | 358/86 |
| 0027321 | 3/1978 | Japan | 358/86 |
| 0146076 | 6/1987 | Japan | H04N 5/208 |
| 63-14577 | 1/1988 | Japan | H04N 5/208 |
| 0050577 | 2/1990 | Japan | H04N 5/208 |
| 3268582 | 11/1991 | Japan | H04N 5/208 |
| 4124977 | 4/1992 | Japan | H04N 5/208 |

*Primary Examiner*—Safet Metjahic
*Assistant Examiner*—Chris Grant
*Attorney, Agent, or Firm*—Sughrue, Mion, Zinn, Macpeak & Seas

[57] ABSTRACT

An automatic picture quality compensating method and apparatus employs a fuzzy theory to entirely analyze three components of brightness and sharpness of the picture image and signal-to-noise ratio in order to achieve an optimal profile compensation of the picture image. The method and system are defined such that the brightness is controlled by using the luminance signal level of the picture image, and the sharpness of the picture quality is controlled by using the vertical correlativity of the luminance signal. In addition, the S/N ratio can be improved by using the envelope of the video signal.

9 Claims, 4 Drawing Sheets

AUTOMATIC PICTURE QUALITY COMPENSATING METHOD AND APPARATUS

This a continuation of application Ser. No. 08/006,782 filed Jan. 21, 1992, now abandoned.

BACKGROUND OF THE INVENTION

1. Field of the Invention

The present invention relates to an automatic picture quality compensating method and apparatus adopting a fuzzy theory, and more particularly, to an automatic picture quality compensating system which generally analyzes a luminance signal level, horizontal high frequency components and vertical correlativity of the brightness signal, and an envelope of a picture image signal using fuzzy theory to optimally correct a profile of the picture image, thereby improving the picture image in quality.

2. Description of the Prior Art

Generally, in a video system such as a video cassette recorder, a color television or the like, a method in which the luminance signal is separated from a composite video signal to adjust the brightness of a picture screen has been proposed to improve the quality of the picture image.

Also, a method in which a high frequency signal having an amplitude below a constant level is extracted from an original video signal and the extracted high frequency signal is then subtracted from the original signal to control the picture image quality has been proposed as well.

For the method in which the luminance signal is extracted, only the brightness of the picture screen may be determined, on the other hand, with the method in which the high frequency component is extracted, even though the horizontal signal component of the picture image is improved, the vertical signal component of the image is likely to be deteriorated in quality or the signal-to-noise (S/N) ratio may be decreased.

Another examplary technique compensates for a preshoot or overshoot by using of a profile correcting circuit to produce a profile correcting signal and takes a signal of minimized deterioration of a signal-to-noise (S/N) ratio produced using a shoot waveform removing circuit on the basis of the profile correcting signal. The technique is disclosed in Japanese patent laid-open publication No. sho 63-14577. With the technique described in the Japanese publication, however, only the S/N ratio is increased. The brightness and high frequency component are not improved. Therefore, in the prior art the picture image cannot be improved in quality satisfactorily.

SUMMARY OF THE INVENTION

Accordingly, an object of the present invention is to provide an automatic picture quality compensating method and apparatus in which a luminance signal level is detected from a composite video signal to adjust brightness of the picture image, a horizontal high frequency component and a vertical correlativity of the picture image are detected to control sharpness of the picture image, and a video envelope of the video signal is detected to improve a signal-to-noise (S/N) ratio. All four of these items are detected and thus the overall picture quality is greatly improved. The four items are then processed using well-known fuzzy logic techniques.

To achieve the above object according to the present invention, there is provided an automatic picture quality compensating method including the steps of: separating a luminance signal from a composite video signal and detecting a level of the luminance signal to adjust a brightness of a picture image; detecting a horizontal high frequency component from the separated luminance signal to determine a sharpness of the picture image; detecting a vertical correlativity signal from the composite video signal and a 1-H delayed signal of the video signal to determine the sharpness of the picture image; detecting an envelope peak value of the video signal; amplifying the luminance signal level, the horizontal high frequency component, the vertical correlativity and the envelope signal with a direct current level; sampling the luminance signal level, the horizontal high frequency component, the vertical correlativity and an envelope signal of the picture image; converting the sampled signals into digital data; operating on the digitally converted luminance signal level, horizontal high frequency component and vertical correlativity of the luminance signal using fuzzy logic to control the brightness and sharpness of the picture image; operating on the digitally converted envelope and luminance signal level of the picture image using fuzzy logic theories to generate a signal for controlling a signal-to-noise ratio; and converting a signal representing the brightness and sharpness of the picture image and the signal-to-noise (S/N) ratio into analog signal to control the picture image in quality.

As another aspect of the present invention, an automatic picture quality compensating apparatus has: a luminance level detecting circuit for separating a luminance signal from a composite video signal and detecting a level of the luminance signal to adjust the brightness of a picture image; a horizontal high frequency component detecting circuit for detecting a horizontal high frequency component from the separated luminance signal to determine the sharpness of the picture image; a vertical correlativity detecting circuit for detecting a vertical correlativity from the composite video signal and a 1H-delayed signal of the video signal to determine the sharpness of the picture image; an envelope detecting circuit for detecting an envelope of the video signal; an amplifying circuit for amplifying the luminance signal level, the horizontal high frequency component, the vertical correlativity and the envelope signal to a direct current (dc) level; a control circuit for receiving the amplified luminance signal level, the horizontal high frequency component, the vertical correlativity of the luminance signal and the envelope signal, converting the signals into digital signals, operating on the digitally converted signals using fuzzy logic to control the brightness and sharpness of the picture image, and operating on the digitally converted envelope and luminance signal level using fuzzy logic to generate a signal-to-noise ratio control signal; and, a signal converting circuit for converting the digital signals of the brightness and sharpness of the picture image and S/N ratio into analog signals and generating a picture quality compensating signal.

According to the present invention thus constructed, the luminance signal level is detected from the composite video signal to adjust the brightness of the picture image. The horizontal high frequency component and vertical correlativity of the picture image are detected to control the sharpness of the picture image. The video envelope of the video signal is detected to improve the signal-to-noise (S/N) ratio.

The above and other objects, features and advantages of the invention will be apparent from the following description in conjunction with the accompanying drawings.

DETAILED DESCRIPTION OF THE INVENTION

Hereinafter, a preferred embodiment of the present invention will be described in detail.

Figure 1:
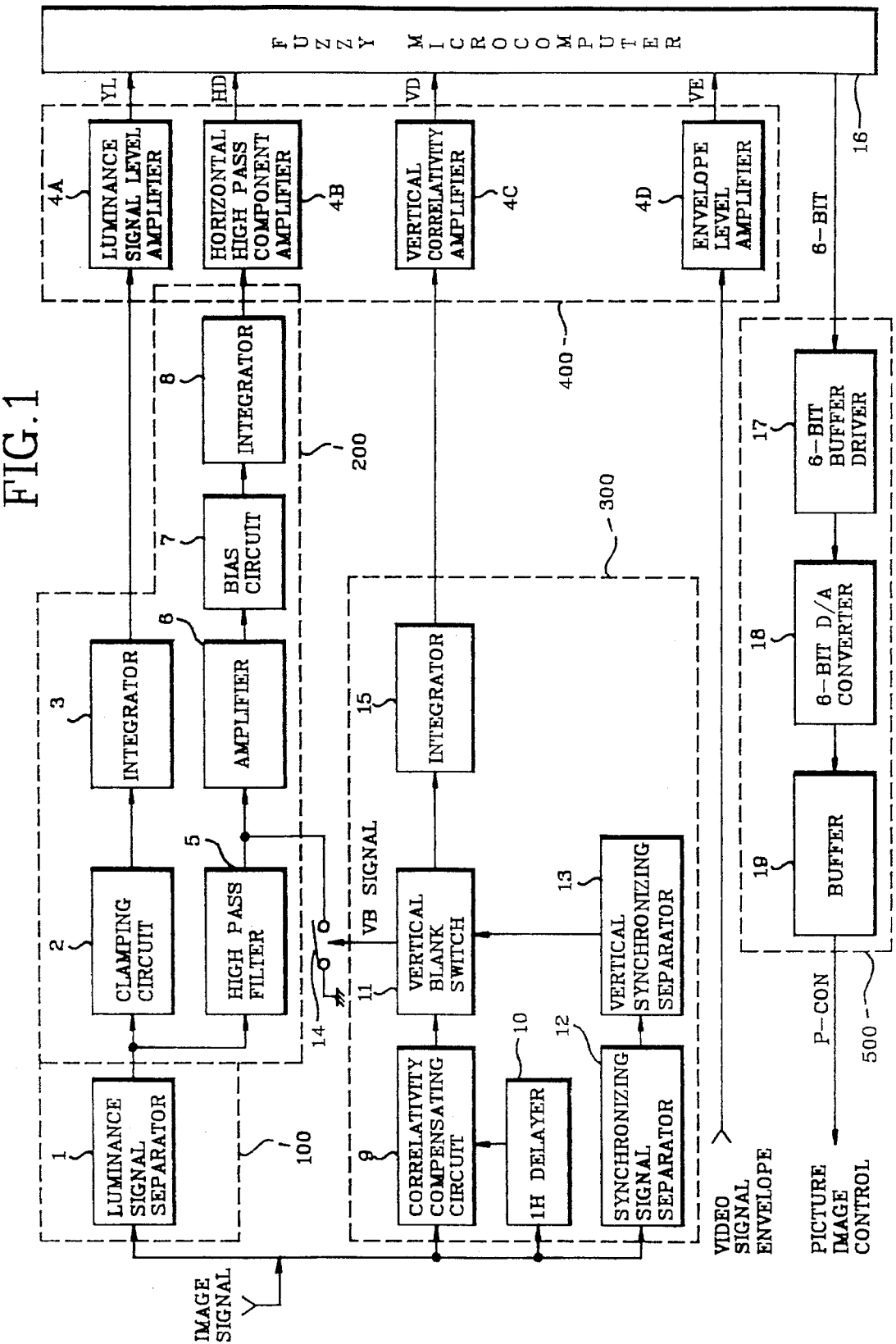
FIG. 1 is a block diagram of an automatic picture quality compensating apparatus adopting a fuzzy theory according to the present invention.

FIG. 1 is a block diagram of an automatic picture quality compensating apparatus according to a preferred embodiment of the present invention wherein the automatic picture quality compensating apparatus serves to automatically improve brightness and sharpness of a picture image and a signal-to-noise (S/N) ratio by using a fuzzy theory employed thereto.

The automatic picture quality compensating apparatus comprises a luminance level detecting portion 100 which separates a brightness signal from a composite video signal and detects a level of the luminance signal to adjust the brightness of the picture image, a horizontal high frequency detecting portion 200 which detects a horizontal high component of the separated luminance signal to determine the sharpness of the picture image and a vertical correlatively detecting portion 300 which detects a vertical correlativity from the composite video signal and 1H-delayed signal of the video signal to determine the sharpness of the picture image.

The apparatus also has a dc level amplifying portion 400 which amplifies the luminance signal level, high frequency component, vertical correlativity and envelope signal in direct current (dc) level, a fuzzy microcomputer 16 which is connected to an output of the dc level amplifying portion 400 for receiving the dc amplified luminance signal level, horizontal high frequency component, vertical correlativity and envelope signal, converting the signals into digital signals and operating on the digitally converted signals to control the brightness and sharpness of the picture image and for operating on the digitally converted envelope and luminance signal level to generate a S/N ratio control signal, and a signal converting portion 500 which converts the digital signals of the brightness and sharpness of the picture image and the S/N ratio control signal into analog signals and generate a picture quality compensating signal.

Preferably, in the luminance level detecting portion 100, a luminance signal separator 1 serves to separate the luminance signal from the composite video signal, and a clamping circuit 2 clamps the luminance signal separated by the luminance signal separator 1. A first integrator 3 integrates the luminance signal clamped at the clamping circuit 2 and converts the integrated luminance signal into a dc level signal determining the brightness of the picture image.

In the horizontal high frequency component detecting portion 200, a high pass filter 5 detects the high frequency component determining the sharpness of the picture image from the luminance signal separated at the luminance signal separator 1, and an amplifier 6 amplifies the high frequency component filtered by the high pass filter 5. A bias circuit 7 supplies a bias signal to the amplified signal from the amplifier 6 and a second integrator 8 integrate the signal output from the bias circuit 7.

The vertical correlativity detecting portion 300 includes a correlativity compensating circuit 9 which mixes the composite video signal and the video signal delayed by a 1H delayer 10 to detect a line correlativity, a synchronizing signal separator 12 and vertical synchronizing signal separator 13 which separates a synchronizing signal from the video signal and detects a vertical synchronizing signal, a vertical blank switch 11 which is connected to the correlativity compensating circuit 9 and the vertical synchronizing signal separator 13 and controls a switch 14 to prevent the use of the horizontal high frequency component for a vertical blanking period when the period is detected from the vertical synchronizing signal, and a third integrator 15 which integrates the output signal from the vertical blank switch 11 to detects a dc component of the correlativity correcting signal.

In the dc level amplifying portion 400, a luminance signal amplifier which is generally designated at 4A amplifies the luminance signal supplied from the integrator 3, and a horizontal high frequency component amplifier which is generally designated at 4B amplifies the horizontal high frequency component outputted from the integrator 8.

A vertical correlativity amplifier which is generally designated at 4C amplifies the vertical correlativity signal and an envelope signal amplifier generally designated at 4D amplifies the envelope signal.

Figure 2:
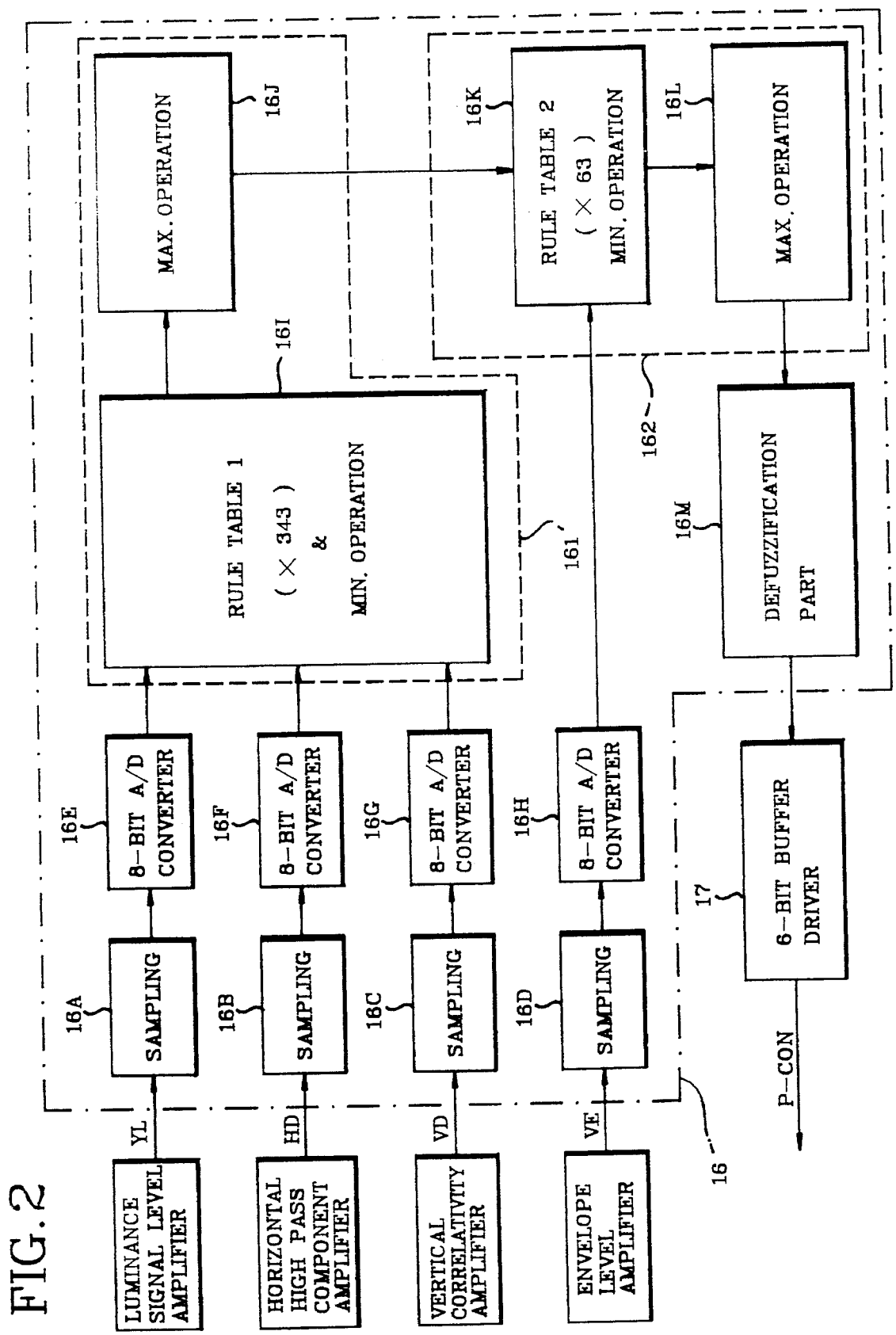
FIG. 2 is a block diagram of a fuzzy microcomputer employed in the present invention.

FIG. 2 is a block diagram of the fuzzy microcomputer 16 shown in FIG. 1. As seen from the drawing, the microcomputer 16 includes a plurality of sampling circuits 16A to 16D which sample the luminance signal level, the horizontal high frequency component, the vertical correlativity and the envelope signal, each being amplified by the amplifiers 4A to 4D in the dc level amplifying portion 400 by predetermined sampling times, a first to fourth analog to digital converters 16E to 16H which convert each sampled signal from the sampling circuits 16A to 16D to digital data signals, a first operation circuit 16I which operates the digitally converted luminance level signal, the horizontal high frequency component and the vertical correlativity data from the first to third A/D converters 16E to 16G to produce a signal for adjusting the brightness and sharpness of the picture image, a second operation circuit 16K which operates on the digitally converted envelope data from the fourth A/D converter 16H and the result data output from the first operation circuit 16I so as to produce a signal for controlling the signal-to-noise (S/N) ratio, and a defuzzification circuit 16M which processes a result signal from the second operation circuit 162 by using a central-moment detecting method and outputting the digital signal.

Now, the operation of the automatic picture quality compensating circuit according to the present invention thus constructed will be described in detail.

The reproduced composite video signal is applied to the luminance signal separator 1 to be separated into a luminance signal and a chroma signal. The separated luminance signal is clamped by the clamping circuit 2 and then applied to the integrator 3 which integrates the luminance signal. The integrated luminance signal is amplified by the luminance level amplifier 4A in the dc level amplifying portion 400.

Meanwhile, the high pass filter 5 which receives the luminance signal separated by the luminance signal separator 1 detects the high frequency component determining the sharpness of the picture image from the luminance signal.

The amplifier 6 amplifies the high frequency component of the luminance signal and applied it to the bias circuit 7. Accordingly, the bias circuit 7 provides the bias voltage to the high frequency component of the luminance signal and applies the biased high frequency component to the integrator 8. Then, the high frequency component of the luminance signal integrated by the integrator 8 is supplied to the horizontal high frequency amplifier 4B to detect the dc component of the high frequency component.

The correlativity correcting circuit 9 receives the video signal and 1H delayed video signal from the 1H delayer 10 and detects the line correlativity signal determining the sharpness of the picture image from the video signals. The line correlativity signal is supplied to the vertical blank switch 11 which detects the vertical blanking period of the video signal in order to prevent the use of the signals, for example, the correlativity signal or high frequency component for the blanking period.

As the vertical synchronizing signal separated from the video signal by the synchronizing signal separator 12 is supplied to the vertical synchronizing separator 13 which supplies the vertical synchronizing signal to the vertical blank switch 11 to detect the vertical blank period. At this time, when the vertical blanking period is detected, the vertical blank switch 11 controls the switch 14 and by-passes the high frequency component output from the high pass filter 5 in order to prevent the use of the horizontal high frequency component for the vertical blank period, and the output of the correlativity correcting circuit 9 is blocked, thus the correlativity is not output to the microcomputer 16.

When the vertical blanking signal is not detected, the correlativity signal passed through the vertical blank switch 11 is integrated by the integrator 15 and then supplied to the vertical correlativity amplifier 4C. The envelope of the video signal is detected by an envelope detector (not shown) and applied to the envelope level amplifier 4D which converts it to dc peak level.

The dc levels of the luminance signal, high frequency component signal, correlativity signal and envelope signal are amplified by the amplifiers 4A, 4B, 4C and 4D comprising the dc level amplifying portion 400, respectively. The luminance level YL, horizontal high frequency component HD, vertical correlativity VD and video envelope VE signal levels are supplied to the fuzzy microcomputer 16. The fuzzy microcomputer 16 executes the operation of the signals, YL, HD, VD and VE by using a fuzzy theory employed therein and has an internal block construction shown in FIG. 2.

Sequentially, the luminance level YL, horizontal high frequency component HD, vertical correlativity VD and envelope VE are sampled by the sampling circuits 16A, 16B, 16C and 16D, respectively, and the sampled signals, YL, HD, VD and VE are applied to the 8-bit analog to digital converters 16E, 16F, 16G and 16H to obtain the digitally converted signals YL, HD, VD and VE, respectively.

In this case, the envelope signal VE, the high frequency component HD and correlativity signal VD are sampled by ten times for one field period, while the luminance level signal is sampled by one hundred times for the same field period.

The luminance level YL, horizontal high frequency component HD and vertical correlativity VD outputted from the 8-bit A/D converters 16E, 16F and 16G are applied to a first rule table 1 16I to be subjected to the minimum operation by one to eight times. This operation result is applied through the maximum operation circuit 16J to a second rule table 2 16K, so that it is subjected to the minimum operation together with the envelope level data which is output from the 8-bit A/D converter 16H by one to four times. Thereafter, the output of the second rule table 2 16K is subjected to the maximum operation by one to four times in a block 16L and the operation result is subjected to the central moment detecting method in a block 16M the outputted as digital data.

In FIG. 2, the first rule table I 16I has 343 conditions having the terms "if" and "then" inputted therein as shown in the appended reference data to execute the minimum operation with relation to the luminance signal YL, high frequency component HD and correlativity VD. The maximum operation block 16J executes the maximum operation to the result of the rule table I. The second rule table 16K has 63 conditions previously set therein and executes the minimum operation for the envelope level and the maximum operation result of the block 16J. In addition, the maximum operation block 16L further executes the maximum operation to the operation result of the rule table 16K and the block 16M applies the central moment detecting method to the result of the maximum operation block 16L to obtain the final output.

Figure 3:
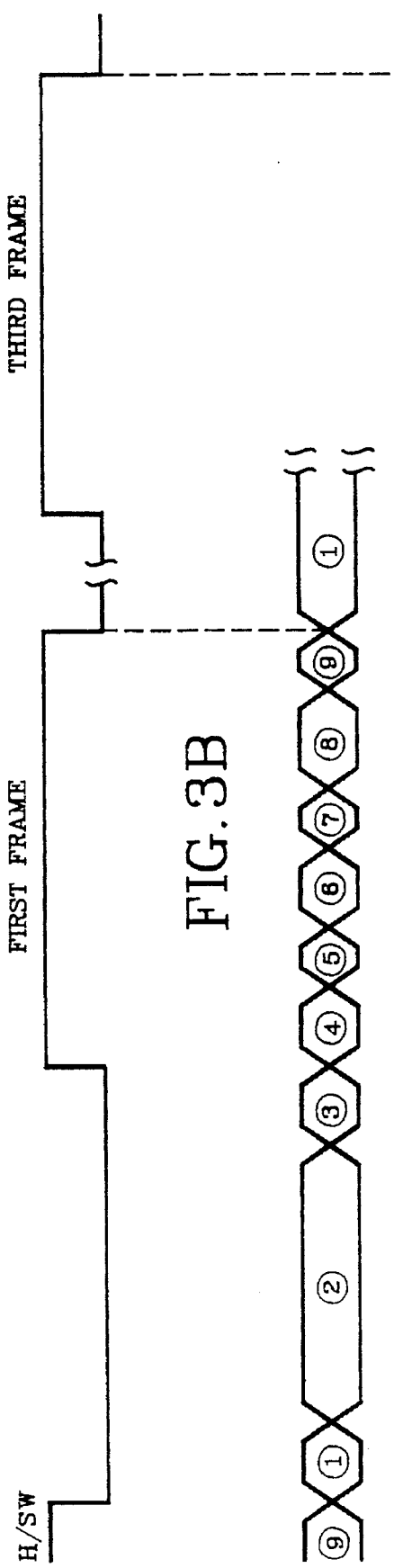
FIGS. 3A–3C are timing charts for illustrating the operating sequence of the fuzzy microcomputer shown in FIG. 2; and, FIG. 4 is view illustrating the maximum and minimum central moment detecting methods according to fuzzy rule tables which are employed in the present invention.

FIG. 3 is a data tables for the maximum and minimum operation according to frames of the picture image wherein FIG. 3(A) illustrates the compensating process of the picture quality by way of a head switching signal H/SW in a unit of one frame or three frames, FIG. 3(B) illustrates the compensating process of the picture quality in a unit of one frame, and FIG. 3(C) illustrates the compensating process executed in a unit of three frames, respectively.

Referring to the timing chart as shown in FIG. 3(B), ①, denotes the vertical blanking period wherein the sampling is not executed by the microcomputer 16. In a period ②, the microcomputer 26 samples the signals and converts the sampled signal into digital signals in a period ③ at a rising edge of the head switching signal H/SW. The microcomputer 16 executes the minimum operation on the basis of the rule table 1 by one to eight times in a period ④ and then executes the maximum operation by one to eight times in a period ⑤. In a period ⑥, the microcomputer 16 applies the rule table 2 to the signals and executes the microcomputer 16 the maximum operation on the signals by one to four times during a period ⑦. Thereafter, the microcomputer 16 executes the central moment detecting method in a period ⑧ and waits a low edge of the head switching signal H/SW in a period ⑨.

Figure 4:
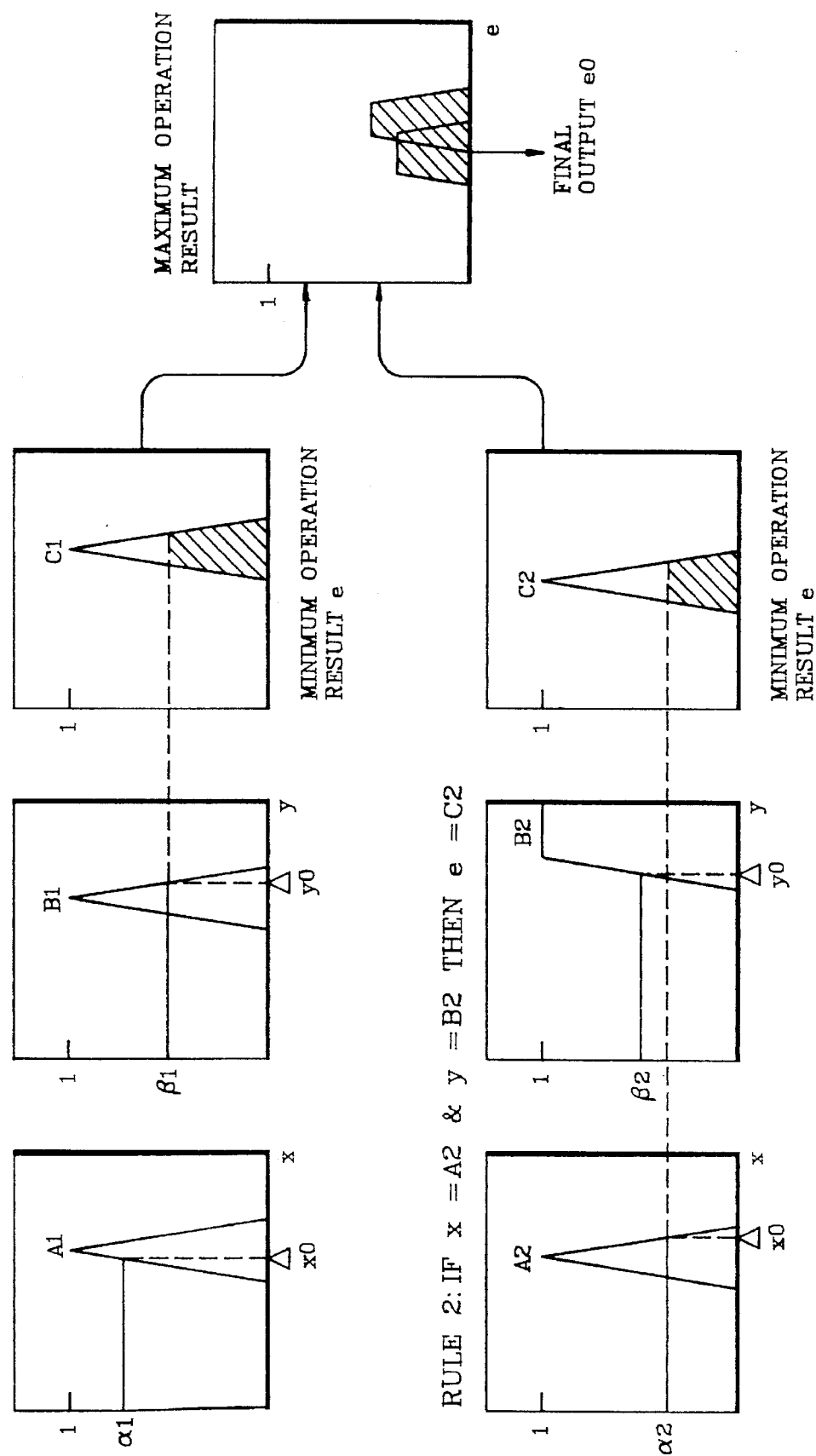

FIG. 4 is a view illustrating the central moment detecting method in the maximum and minimum operations. In the rule table 1, if the analog to digital data X0 and Y0 are $\alpha_1$ and $\beta_1$, respectively, the minimum operation result becomes C1. Meanwhile, when, in the rule table 2, the data X0 and Y0 are $\alpha_2$ and $\beta_2$, respectively, then the minimum operation result becomes C2. In this case, the maximum operation result is obtained by summing the results C1 and C2.

Referring to FIG. 4, there is shown an exemplary fuzzy theory employed to the present invention, but it is noted that the conditions having the terms "if" and "then" may be employed to the luminance level YL, high frequency component HD and correlativity VD to improve the sharpness and brightness of the picture screen while the terms "if, then" may be is also applied to the luminance signal level YL and envelope VE to improve the S/N ratio.

Meanwhile, the digital signal for the picture image control outputted from the fuzzy microcomputer 16 is applied to a 6-bit digital to analog converter 18 through a 6-bit buffer driver 17 and then converted into an analog signal, so that the analog signal is applied as a picture image control signal P-CON by being passed through a buffer 19 so as to properly control a condition of the picture image.

As described above, according to the present invention fuzzy theory is employed. The brightness of the picture screen can be controlled by using the luminance signal level of the picture image. The sharpness can be controlled by using the horizontal high frequency component and vertical correlativity of the luminance signal. In addition, the S/N ratio can be controlled by using the envelope of the video signal. As a result, it is possible to optimally correct the profile of the picture image.

Although the present invention has been described with reference to the specified example, it should be noticed that various modifications and changes will be made therein without departing from the spirit and scope of the invention.

What is claimed is:

1. An automatic picture quality compensating signal generating method, comprising the steps of:

separating a luminance signal from a composite video signal and detecting a level of the luminance signal to adjust a brightness of a picture image;

detecting a horizontal high frequency component from the separated luminance signal to determine a sharpness of the picture image;

detecting a vertical correlativity signal from the composite video signal and a 1-H delayed signal of the composite video signal to determine the sharpness of the picture image;

detecting an envelope peak value of the composite video signal;

sampling the luminance signal level, the horizontal high frequency component, the vertical correlativity signal and the envelope signal of the picture image;

converting the sampled signals into digital data signals;

executing operation of the digitally converted luminance signal level, horizontal high frequency component and vertical correlativity signal based on fuzzy theory to control the brightness and sharpness of the picture image;

executing operation of the digitally converted envelope signal based on fuzzy theory to generate a signal for controlling a signal-to-noise ratio signal; and converting a signal representing the brightness and sharpness and the signal-to-noise ratio of the picture image into an analog signal so a to permit control of the picture image quality.

2. The automatic picture quality compensating signal generating method of claim 1, wherein the luminance signal level is sampled one hundred times in a field period; and wherein the horizontal high frequency component, the vertical correlativity signal, and the envelope signal are sampled ten times in a field period.

3. An automatic picture quality compensating signal generating apparatus comprising:

luminance level detecting means for separating a luminance signal from an input composite video signal and detecting a level of the luminance signal to adjust the brightness of a picture image;

horizontal high frequency component detecting means for detecting a horizontal high frequency component from the separated luminance signal to determine sharpness of the picture image;

vertical correlativity detecting means for detecting a vertical correlativity from the composite video signal and a 1H delayed signal of the composite video signal to determine the sharpness of the picture image;

envelope detecting means for detecting an envelope signal of the composite video signal;

control means for receiving the luminance signal level, the horizontal high frequency component, the vertical correlativity and the envelope signal, converting said signals into digital signals, operating on the digitally converted signals corresponding to the luminance signal level, the horizontal high frequency component and the vertical correlativity using a fuzzy theory to control the brightness and sharpness of the picture image, and operating on the digitally converted envelope signal using a fuzzy theory to generate a S/N ratio control signal; and signal converting means for receiving, from said control means, a digital signal which represents the brightness and sharpness and the S/N ratio of the picture image, converting the digital signal into an analog signal and generating a picture quality compensating signal based on the analog signal.

4. The automatic picture quality compensating signal generating apparatus according to claim 3, wherein said luminance level detecting means includes a luminance signal separator for separating the luminance signal from the composite video signal, a clamping circuit for clamping the luminance signal separated by said luminance signal separator and a first integrator for integrating the luminance signal clamped by the clamping circuit and converting the integrated luminance signal into a dc level signal determining the brightness of the picture image.

5. The automatic picture quality compensating signal generating apparatus according to claim 3, wherein said horizontal high frequency component detecting means comprises a high pass filter for detecting a high frequency component determining the sharpness of the picture image from the luminance signal separated by the luminance signal separator, an amplifier for amplifying the high frequency component filtered by the high pass filter, a bias circuit for providing a bias signal voltage to the amplified signal from the amplifier, and a second integrator for integrating the signal output from the bias circuit.

6. The automatic picture quality compensating signal generating apparatus according to claim 3, wherein said vertical correlativity detecting means includes a correlativity compensating circuit for mixing the composite video signal and the 1H delayed signal to detect a line correlativity, a synchronizing signal separator and vertical synchronizing signal detector for separating a synchronizing signal from the video signal and detecting a vertical synchronizing signal, a vertical blanking switch connected to said correlativity compensating circuit and the vertical synchronizing signal detector for controlling a switch to prevent the use of the horizontal high frequency component for a vertical blanking period when the vertical blanking period is detected from the vertical synchronizing signal, and a third integrator for integrating the output signal from the vertical blanking switch to detect a DC component of the correlativity correcting signal.

7. The automatic picture quality compensating signal generating apparatus according to claim 3, wherein said control means includes a plurality of sampling circuits for sampling the luminance level signal, the horizontal high frequency component, the vertical correlativity and the envelope signal, each being amplified at the DC level amplifying means by predetermined sampling times, first to fourth analog to digital converters for converting each sampled signal from the sampling circuits, a first operation circuit for operating on the digitally converted luminance level signal, the horizontal high frequency component and the vertical correlativity data from the first to third A/D converters to produce a signal for adjusting the brightness and sharpness of the picture image, a second operation circuit for operating on result data output from the first operation circuit and the digitally converted envelope data from the fourth A/D converter to produce a signal for controlling the brightness, sharpness and S/N ratio control signal, and a defuzzification circuit for processing a result signal from the second operation circuit by using a center of gravity method and outputting the digital signal.

8. The automatic picture quality compensating apparatus according to claim 7, wherein the luminance signal level is sampled one hundred times in a field period; and wherein the horizontal high frequency component, the vertical correlativity, and the envelope signal are sampled ten times in a field period.

9. An automatic picture quality compensating signal generating method, comprising the steps of:

separating a luminance signal from a composite video signal and detecting a level of the luminance signal to adjust a brightness of a picture image;

detecting a horizontal high frequency component from the separated luminance signal to determine a sharpness of the picture image;

detecting a vertical correlativity signal from the composite video signal and a 1-H delayed signal of the composite video signal to determine the sharpness of the picture image;

detecting an envelope peak value of the composite video signal;

sampling the luminance signal level, the horizontal high frequency component, the vertical correlativity signal and the envelope signal of the picture image;

converting the sampled signals into digital data signals;

executing a first operation of the digitally converted luminance signal level, horizontal high frequency component and vertical correlativity signal based on fuzzy theory to generate a first control signal for controlling the brightness and sharpness of the picture image;

executing a second operation of the first control signal and of the digitally converted envelope signal based on fuzzy theory to generate a second control signal for controlling the brightness, sharpness, and a signal-to-noise ratio signal;

processing the second control signal using a center of gravity method; and converting the processed second control signal representing the brightness, the sharpness, and the signal-to-noise ratio of the picture image into an analog signal so as to permit control of the picture image quality.

\* \* \* \* \*